R. P. KEASBEY.
BUILDING CONSTRUCTION.
APPLICATION FILED APR. 21, 1916.
1,296,527.
Patented Mar. 4, 1919.
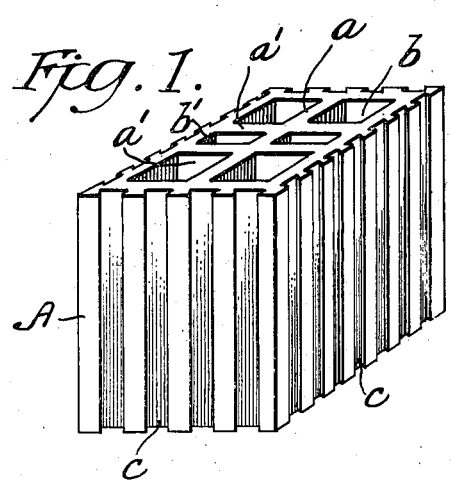
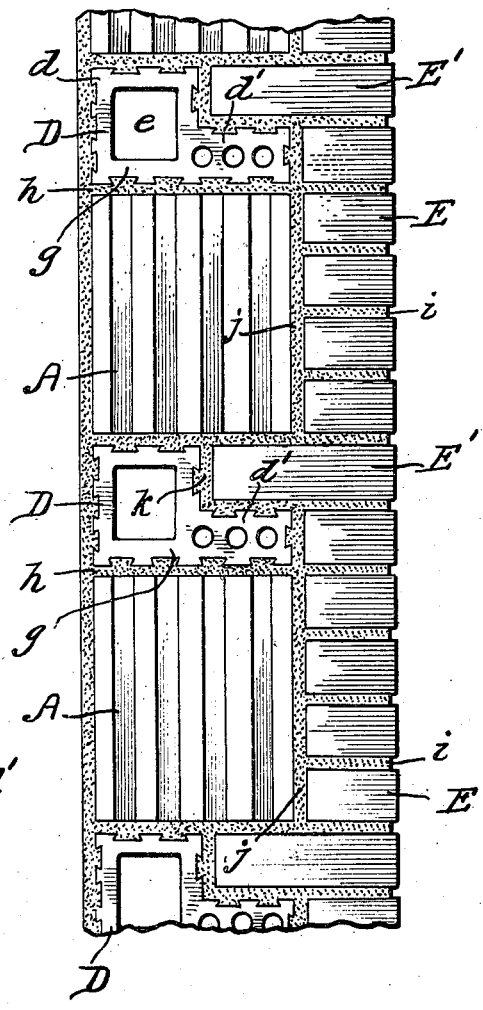
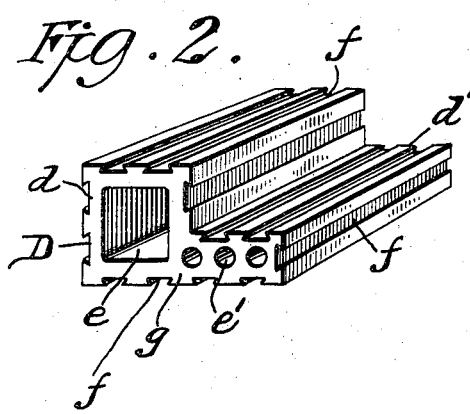
Inventor,
Rowland P. Keasbey
By Edson Bernhard
Attorneys.

UNITED STATES PATENT OFFICE.

ROWLAND P. KEASBEY, OF NEW YORK, N. Y., ASSIGNOR TO NATIONAL FIRE PROOFING CO., OF PITTSBURGH, PENNSYLVANIA, A CORPORATION OF PENNSYLVANIA.

BUILDING CONSTRUCTION.

1,296,527.        Specification of Letters Patent.        Patented Mar. 4, 1919.

Application filed April 21, 1916. Serial No. 92,583.

*To all whom it may concern:*

Be it known that I, ROWLAND P. KEASBEY, a citizen of the United States, residing at the city of New York, borough of Manhattan, county and State of New York, have invented a certain new and useful Building Construction, of which the following is a specification.

This invention pertains to the construction of walls for buildings, and, more particularly, to walls composed of hollow tiles faced with brick veneer.

In the building trade a demand exists for walls composed of hollow tiles for the reason that such walls with internal air spaces possess the qualities of insulation against heat and cold, and furthermore can be constructed economically. Hollow tile walls are usually covered internally thereof by applying a plaster coat directly to the surface of the tiles, but it is necessary to impart a suitable finish to the exterior surface of the tiles, it being common practice to use stucco or a brick veneer as the exterior finish.

According to the present invention, provision is made for combining the hollow tiles interiorly of the wall with a brick finish on the exterior thereof, the object in view being to so organize the tiles and the brick that a wall of the required strength and weight-carrying capacity is produced and the tiles and brick are overlapped and bonded one to the other in a substantial manner.

In this invention, two forms of hollow tiles are used, one of which consists of the well known open-ended cellular tiles adapted to be positioned on end within the wall, whereas the other tiles are of stepped form, *i. e.*, each stepped tile comprises two members, one member being about twice the thickness of the other member and the two said members having a common bottom or slab, whereby the slab of the stepped tile is adapted to be positioned over the open ended cellular tiles and to be bonded thereto, thus securing by the aid of mortar or cement a solid connection between the open end of the cellular tiles and the bottom slabs of said stepped tiles. The facing bricks are laid, as usual, exteriorly to the hollow tiles, but the header bricks (used as the bond between the brick veneer and the hollow tiles) are positioned in overlapping relation to the slabs formed by the stepped tiles, so that the header bricks and the stepped tiles are also bonded together by a layer of interposed cement or mortar.

A composite wall of the desired thickness can be constructed rapidly and economically by assembling the two forms of hollow tiles and the brick facing as herein disclosed. In this connection, it is manifest that the header bricks and the stepped tiles are bonded together in a substantial manner, and said stepped tiles are similarly bonded to the cellular tiles, as a result of which the tiles and brick constitute a wall possessing the required strength and having the desired exterior appearance.

The stepped tiles provided with the continuous bottom slab and united to the cellular tiles, and positioned in overlapping relation to the header bricks of the exterior facing, are the salient features of my new composite wall. Said stepped tiles can be easily placed in position and united by mortar or cement to the webs and walls of the cellular tiles at the ends of the latter, the bottom slabs of said stepped tiles being substantially equal in area to the area of the open ended cellular tiles. Each stepped tile is of hollow construction to reduce the weight and to provide for the flow of heat through the interior of the tile and secure uniformity in burning the clay material during the manufacture of the tile, it being preferred to provide a single chamber in the member of greatest thickness, whereas the relatively thin member is provided with a plurality of longitudinal passages.

Other features and advantages of the invention will appear from the following description taken in connection with the drawings, wherein—

Figure 1 is a perspective view of an ordinary tile adapted to be used in the construction of the building wall of this invention.

Fig. 2 is a perspective view of the hollow stepped tile adapted to be overlapped by the headers of the brick facing.

Fig. 3 is a sectional elevation of a portion of a wall composed of cellular tiles and stepped tiles assembled and united with a brick facing in accordance with this invention.

The hollow tiles A are assembled with stepped tiles D and the facing bricks E E' to constitute the wall. Said tiles A may be positioned horizontally or vertically in the wall, and they are arranged in courses or horizontal layers, as shown in Fig. 3. The hollow tile selected for illustration comprises a front wall, a back wall, two end walls, a longitudinal web $a$ and a plurality of cross webs $a'$, said cross webs being united with the front and rear walls and intersecting with the longitudinal web $a$ so as to produce a series of longitudinal cells $b$ and a plurality of other cells $b'$, the latter cells $b'$ being of less cross sectional area than the cells $b$. The exterior surfaces of the hollow tile are provided with longitudinal grooves $c$, preferably dove-tailed in cross section.

The tiles A are preferably positioned on end within the wall, i. e. the tiles are arranged for the open ends thereof to be at the top and bottom, respectively, of said tiles. Positioned intermediate the top end of one tile and the bottom end of the other tile next above it are stepped tiles D, shown in detail in Fig. 2 of the drawings. Each stepped tile consists of a plurality of members $d$, $d'$ integral with each other, the member $d$ exceeding the height of the member $d'$ so as to impart the desired stepped form to the tile D. The member $d$ is twice the thickness of the member $d'$, plus a mortar joint, and this member $d$ is provided with a longitudinal chamber $e$ extending horizontally through the tile. The relatively thin member $d'$ of the stepped tile is provided with longitudinal passages $e'$, said chamber $e$ and the passages $e'$ reducing to a minimum the material composing the tile, thus minimizing the weight of the stepped tile, and said chambers providing for the free flow of heat through the material of the tile during the process of baking or burning said tile in the manufacture thereof. The exterior surfaces of the stepped tile are provided with longitudinal dove-tailed grooves $f$, similarly to the dove-tailed grooves $c$ of the cellular tile A, whereby the mortar or cement employed in the construction of the wall is adapted to be keyed to the grooved surface of the tiles as well as to be bonded thereto.

A salient feature of this invention consists in the construction of the stepped tile with a continuous bottom slab $g$, the latter being common to the members $d$, $d'$, and the area of said bottom slab $g$ being equal substantially to the area at the end of a cellular tile.

In constructing walls with ordinary tiles and faced with brick, experience shows that it is difficult to unite or bond the brick with the open ends of the hollow tiles. In my invention this difficulty is overcome by the use of stepped tiles, the bottom slab of which is equal substantially to the area of the open end of the hollow tiles. In assembling the stepped tiles with respect to the hollow tiles, mortar or cement is first applied to the end edges of the walls and webs composing the hollow tiles, and the stepped tiles are then positioned upon the mortar, said stepped tiles practically covering the open ends of the hollow tiles and being united solidly thereto by the intervening strata of mortar or cement, whereby the stepped tiles are solidly united with the hollow tiles.

In constructing the wall, a suitable foundation is first prepared, as is usual, and a course of the cellular tiles A is laid upon the foundation, the tiles being positioned on end, and the tiles in each course being united together by an interposed layer of cement or mortar, as is usual. Thereafter, a course of stepped tiles is imposed upon the open top ends of the tiles A, the stepped tiles and the cellular tiles being united by a layer of mortar or cement, as at $h$. At any suitable time in the construction of the wall, a facing composed of brick E is laid against the outer face of the hollow tiles, the brick E being united by cement or mortar $i$ to each other and by cement or mortar $j$ to the hollow tiles and the members $d'$ of the stepped tiles. Every sixth course of facing E consists of a course of header brick E′, the length of the header brick exceeding the width of the facing brick, whereby the header brick are positioned in overlapping relation to the members $d'$ of the stepped tile, as clearly shown in Fig. 3, said courses of header brick being united to the top surface of the members $d'$ and the front surface of the members $d$ of said stepped tile D by layers of mortar or cement $k$. The header brick not only overlap and are bonded to the stepped tile, but the top surfaces of the header brick are substantially flush with the corresponding surfaces of the members $d$ of stepped tile D, thus providing a substantially continuous surface upon which mortar or cement may be spread prior to resuming the operation of installing the hollow tile and the facing brick.

From the foregoing description taken in connection with the drawings it will be seen that I have provided hollow tiles and stepped tiles of such form that they can be easily and quickly assembled with the facing brick, including the header courses of facing brick, so as to produce a composite wall possessing the required strength and weight-carrying capacity, the tiles and brick being assembled easily and quickly in such manner as to be thoroughly bonded one to the other.

Having thus fully described the invention, what I claim as new, and desire to secure by Letters Patent is:—

1. In building construction, a wall embodying courses of cellular tiles the openings in which extend vertically so as to open through the top and bottom of said tiles, hollow stepped tiles the openings in which extend horizontally, each stepped tile comprising a plurality of members one of which exceeds the other in height and provided with a continuous bottom slab common to the two members, and a facing composed of brick which includes header courses the latter being in overlapping relation to and bonded with the smaller members of said stepped tiles.

2. In building construction, a wall embodying courses of cellular tiles the openings in which extend vertically so as to open through the top and bottom of said tiles, hollow stepped tiles each course of which is interposed between two adjacent courses of cellular tiles, each stepped tile comprising two members one of greater height than the other and provided with horizontally extending openings and the two said members having a continuous bottom slab which presents an imperforate surface extending across the vertical openings in the cellular tiles and which bottom slab is bonded to the open top end of the subjacent cellular tiles, and a facing composed of brick including header courses the latter being in overlapping relation to the smaller members of the stepped tiles and bonded with said stepped tiles along two surfaces thereof.

3. In building construction, a wall embodying cellular tiles the openings in which extend vertically, hollow stepped tiles the openings in which extend horizontally, each stepped tile being composed of two members with a common continuous bottom slab and with one member being about one-half the height of the other member, said stepped tiles being interposed between the cellular tiles and presenting unbroken surfaces extending across said vertical openings therein whereby the stepped tiles are bonded to the end faces of the cellular tiles, and a facing composed of brick including header courses the latter being in overlapping relation to the stepped tiles and bonded therewith.

In testimony whereof I have hereunto signed my name.

ROWLAND P. KEASBEY.